United States Patent
Tihanyi et al.

[11] Patent Number: 5,948,034
[45] Date of Patent: Sep. 7, 1999

[54] METHOD OF CONTROLLING A POWER UNIT OF A VEHICLE

[75] Inventors: Katalin Tihanyi, Turin; Massimo Prata, Pont Saint Martin; Giuseppe Cuzzucoli, Pianezza, all of Italy

[73] Assignee: Iveco Fiat S.p.A., Turin, Italy

[21] Appl. No.: 08/580,290

[22] Filed: Dec. 28, 1995

[30] Foreign Application Priority Data

Dec. 29, 1994 [IT] Italy .................................. TO94A1091

[51] Int. Cl.⁶ .................................................. G06G 7/70
[52] U.S. Cl. ............................... 701/64; 701/51; 701/55; 477/78; 477/120
[58] Field of Search ................. 364/424.08, 424.082, 364/424.084, 424.085, 424.086, 424.087, 424.088, 424.093; 477/108, 107, 111, 91, 97, 110, 109, 94, 78, 120, 121, 154, 155; 74/335, 336 R, 473 R; 340/439; 123/478, 480, 417, 425, 432; 701/55, 63, 66, 54, 51

[56] References Cited

U.S. PATENT DOCUMENTS

| | | | |
|---|---|---|---|
| 4,494,404 | 1/1985 | Striffler | 73/113 |
| 4,551,802 | 11/1985 | Smyth | 701/55 |
| 4,569,255 | 2/1986 | Holmes | 701/54 |
| 4,576,065 | 3/1986 | Speranza et al. | 701/55 |
| 4,595,986 | 6/1986 | Daubenspeck et al. | 364/424.08 |
| 4,630,508 | 12/1986 | Klatt | 364/424.083 |
| 4,648,291 | 3/1987 | Klatt et al. | 364/424.094 |
| 4,698,762 | 10/1987 | Moriya et al. | 364/424.082 |
| 4,698,763 | 10/1987 | Smyth | 701/56 |
| 4,852,006 | 7/1989 | Speranza | 701/55 |
| 4,916,979 | 4/1990 | Irwin | 701/55 |
| 4,947,331 | 8/1990 | Speranza | 701/55 |
| 4,964,318 | 10/1990 | Ganoung | 477/110 |

FOREIGN PATENT DOCUMENTS

| | | |
|---|---|---|
| 0 347 261 A2 | 6/1989 | European Pat. Off. . |
| 0 537 811 A1 | 9/1992 | European Pat. Off. . |
| 0 635 659 A2 | 7/1994 | European Pat. Off. . |
| 33 34 722 A1 | 4/1985 | Germany . |
| 42 09 150 A1 | 9/1992 | Germany . |
| 43 34 146 A1 | 4/1994 | Germany . |
| 43 37 957 A1 | 5/1994 | Germany . |

*Primary Examiner*—Jacques H. Louis-Jacques
*Attorney, Agent, or Firm*—Shlesinger Arkwright & Garvey LLP

[57] ABSTRACT

A method of controlling a power unit of a vehicle, comprising a stage of calculating the theoretical increment/decrement (Ge, Gd) in the gear number required to pass from the actual operating condition of the vehicle to a condition of maximum power and, respectively, of maximum economy, and a stage of calculating the increment/decrement in the gear number required to obtain the optimum gear by means of an average of the theoretical increments/decrements (Ge, Gd) weighted with weighting factors (Ke, Kd) calculated on the basis of operating parameters of the vehicle detected by means of onboard sensors.

8 Claims, 4 Drawing Sheets

METHOD OF CONTROLLING A POWER UNIT OF A VEHICLE

BACKGROUND OF THE INVENTION

The present invention relates to a method of controlling an automated power unit of a vehicle, for example a commercial vehicle.

Automated power units are known comprising an engine, a clutch and an automatic mechanical gearbox, which are controlled by an electronic control unit. In particular, the control unit is adapted to determine the optimum gear to be engaged according to stored control logics, on the basis of the operating conditions of the vehicle detected by means of sensors on board the vehicle; once the optimum gear has been determined, the control unit controls the engagement thereof and ensures the management of the clutch and the control of the supply to the engine during a gear-change.

The logics for determining the optimum gear generally comprise associating in a deterministic manner a given gear with a given set of values of the detected operating parameters (normally just the number of revolutions and the position of the accelerator pedal); the control achieved in this way may be satisfactory in average operating conditions but, since it does not take into account dynamic driving conditions, it is generally wholly inadequate in certain operating conditions.

In some instances, the control unit can operate in accordance with a plurality of distinct logics, which can be selected by the driver and which are adapted to different modes of driving (economical or sporting) or to different road or load conditions; in any case, the gear is rigidly selected by the control unit so as to optimise each time a predetermined parameter (for example, fuel consumption or power output), without taking into account voluntary deviations on the part of the driver from the selected mode of driving.

SUMMARY OF THE INVENTION

The invention has the object of devising a method of controlling a power unit which does not have the above-mentioned drawbacks and which, in particular, makes it possible to determine the optimum gear to be engaged in a manner taking into account road conditions and the performance required by the driver, with a view to achieving the optimum compromise between operating economy and dynamic performance.

This object is achieved by the present invention in that it relates to a method of controlling a power unit of a vehicle, comprising an engine, a clutch and an automatic gearbox provided with a plurality of gears, said method being characterised in that it comprises a first stage for determining the value of a plurality of operating parameters related to the driving conditions, a second stage for determining a first quantity representing the gear to be engaged so as to achieve a condition for optimising fuel consumption, and a second quantity representing the gear to be engaged so as to achieve a condition for optimising performance, and a third stage for determining an optimum gear based on a function of said first quantity and said second quantity depending on said operating parameters.

BRIEF DESCRIPTION OF THE DRAWINGS

With a view to a better understanding of the present invention a preferred embodiment will be described non-restrictively by way of example below, with reference to the accompanying drawings, in which.

DETAILED DESCRIPTION OF THE INVENTION

Figure 1:
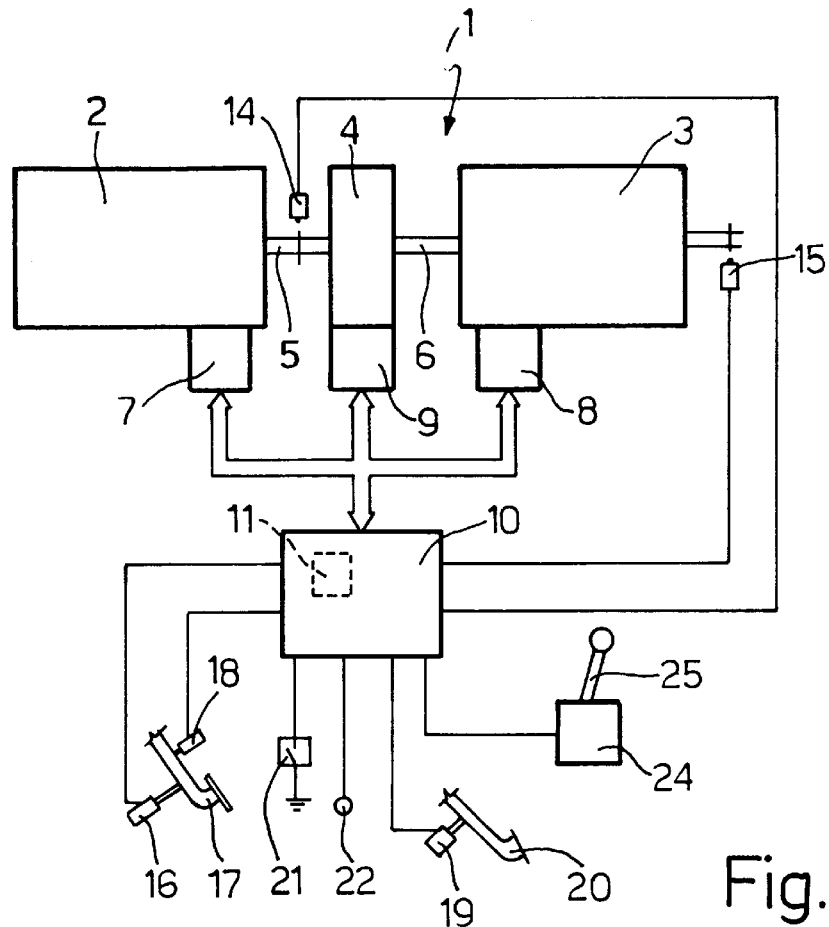
FIG. 1 illustrates schematically an automated power unit of a vehicle, provided with a control unit operating in accordance with the present invention.

With reference to FIG. 1, the reference numeral 1 generally designates a power unit for a vehicle, for example a commercial vehicle.

The power unit 1 substantially comprises a heat engine 2, an automatic mechanical gearbox 3 and a clutch 4 interposed between an output shaft 5 of the engine 5 and an input shaft 6 of the gearbox 3.

The engine 2 is provided with an electronic regulator 7 for regulating the quantity of fuel admitted. The gearbox 3 and the clutch 4 are provided with respective pneumatic actuators 8, 9 which can be actuated electrically by means of respective valve assemblies (not shown).

The unit 1 is connected to an electronic control unit 10 which is connected with the regulator 7 and with the actuators 8, 9 so as to transmit control signals thereto and to receive feedback signals. The control unit is also connected with a plurality of onboard sensors from which it receives input signals related to the operating conditions of the vehicle itself and to the actions of the driver.

In particular, the unit 10 is connected with:

a sensor 14 for measuring the angular velocity of the drive shaft 5 (abbreviated in the following to "engine speed");

a sensor 15 for measuring the angular velocity of the gearbox output shaft, which generates signals proportional to the speed of the vehicle;

a potentiometer 16 connected to the accelerator pedal 17 and adapted to generate an electric signal proportional to the depressing of the pedal itself;

a switch 18 connected to the accelerator pedal 17 and adapted to generate an active signal when the pedal itself is released;

a switch 19 connected to the brake pedal 20 and adapted to switch over when said pedal is depressed: advantageously, the same switch is used as that conventionally used to control the illumination of the rear "stop" lights;

a switch 21 connected to the engine braking control (not shown);

a pushbutton 22 for cutting in/cutting out the automatic management of the power unit;

transducer means 24 connected to a gear-selector lever 25'; the latter is advantageously of the "up/down" type.

The unit 10 can operate in accordance with a program stored in the unit itself and adapted to manage automatically all the operations associated with gear-changing, irrespective of road conditions and the mode of driving; the automatic management, which is suitably de-activated when the vehicle is started up, can be activated by actuating the pushbutton 22; each successive actuation of the pushbutton 22 effects the switching over of the activated/de-activated state of the automatic system.

When the program is de-activated, the system behaves like a conventional automated power unit; the gear-changes are carried out on the basis of manual selections by the driver and the control of the clutch is automatic.

The option of effecting manual gear-changes is provided even when the automatic system is activated; following manual switching, the control unit 10 temporarily suspends the automatic management and executes said manual gear selection.

The automatic control program of the power unit 1 is configured in three modules:

A. Determination of the basic quantities for the gear-change strategy;

B. Determination of the optimum gear and management of the gear-change;

C. Control of the engine in the stage immediately following the gear-change.

These modules and the relative interrelations will be described in detail below.

A. Determination of the Basic Quantities for the Gear-Change Strategy.

On the basis of the input signals received from the onboard sensors, with a sampling frequency equal, for example, to several tens of Hz, the data relating to engine speed, to the position of the accelerator pedal and to the speed of the vehicle are recorded instantaneously. On the basis of said data and operating maps of the engine 2 and the regulator 7 stored in a memory unit 11 of the control unit 10, this latter is able to obtain instantaneously the data relating to torque and power produced by the engine. In addition, from the differential of the position of the accelerator pedal and the speed of the vehicle with respect to time, determined between two successive instants of sampling, there are recorded the derivative of the position of the accelerator pedal and the derivative of speed, i.e. the acceleration of the vehicle.

Finally, with a view to determining the optimum gear for which at the successive point B the control unit 10 firstly calculates, on the basis of the data acquired directly and indirectly as described above, the weight of the vehicle and the driving resistance.

This calculation is carried out on the basis of the dynamic equation of the vehicle:

$$k_M \cdot M = m \cdot \theta + m \cdot a + k_j \cdot a + k_v \cdot v^2,$$

where M is the torque generated by the engine, m is the weight of the vehicle, $\theta$ is the driving resistance, a is the acceleration and v is the vehicle speed, moreover:

$$k_M = e \cdot \tau_g \cdot \tau_h / r$$

(e=total transmission efficiency), $\tau_g$=gear ratio, $\tau_h$=final drive ratio, r=wheel radius); $\theta$=g·(f cos $\alpha$+sin $\alpha$) (g=gravity acceleration; f=coefficient of wheel-road friction; $\alpha$=angle of road gradient);

$k_j = J/r^2$ (J=rotating mass inertia concentrated at the axles of the driving wheels; r=wheel radius);

$k_v = C_x \cdot d/2 \cdot A$ ($C_x$=coefficient of air penetration resistance; d=air density; A=frontal area of the vehicle).

By applying the equation (1) in two successive sampling instants, for example with an interval of 30 ms between them, the weight being constant and it being possible to suppose, reasonably, that the driving resistance also remains constant during this interval of time, there results:

$$m = [k_M \cdot \delta M - k_j \cdot \delta a - k_v \cdot \delta(v^2)]/\delta a, \quad (2)$$

wherein the symbol $\delta$ preceding a variable indicates the increment thereof detected during the sampling interval.

Because of the low values which are generally encountered both in the acceleration a and in its increment $\delta a$, the calculation of the weight supplied by equation (2) may deviate substantially from the actual value; to obviate this drawback the control unit 10 repeats cyclically the weight calculation in accordance with equation (2) for a predetermined time interval, for example 2 minutes, and it considers the effective value of the weight to be the arithmetic mean of the values calculated. Advantageously, the calculation of the weight is temporarily suspended when one of the following conditions arises:

a) the absolute value of the product m*$\theta$, calculated from equation 1, is lower than a predetermined threshold value: in fact, experimentally it has been found that this is the condition in which the equation (2) can give the highest degree of error;

b) during the stages in which the clutch is disengaged, i.e. take-off and gear-changing, it not being easy to determine the torque delivered by the engine;

c) when the brake pedal is depressed, since it cannot be assumed that the driving resistance is constant, and d) in the event of an abrupt variation in the admission of fuel, with consequent uncertainty in determining power and thus the instantaneous torque.

After the vehicle has been started up and until the weight calculation is carried out (in particular, with condition a) persisting, according to which the rapid completion of the calculation can be impeded), the unit 10 assumes for the weight a stored reference value which, for example, is equal to the weight of the vehicle under average load conditions.

On the basis of the value calculated for the vehicle weight or the above-mentioned reference value, the control unit 10 is able to calculate instantaneously, from equation 1), the value of the driving resistance $\theta$. Since, unlike the weight, the driving resistance $\theta$ is a quantity which is variable with time, it is not possible to use the method of the average to ensure the reliability of the data obtained; therefore, the data are filtered by means of a digital low-pass filter, for example of Butterworth type, advantageously having a double-pole frequency response at 0.2 Hz.

B. Determination of the Optimum Gear and Control of the Gear-Change.

The determination of the optimum gear is effected by means of a single optimisation algorithm, valid in any driving condition, operating on the basis of fuzzy logic rules.

Said algorithm considers two opposite situations:

1. Economy driving, i.e. seeking minimum consumption.
2. Dynamic driving, i.e. seeking maximum acceleration/deceleration.

Figure 2:
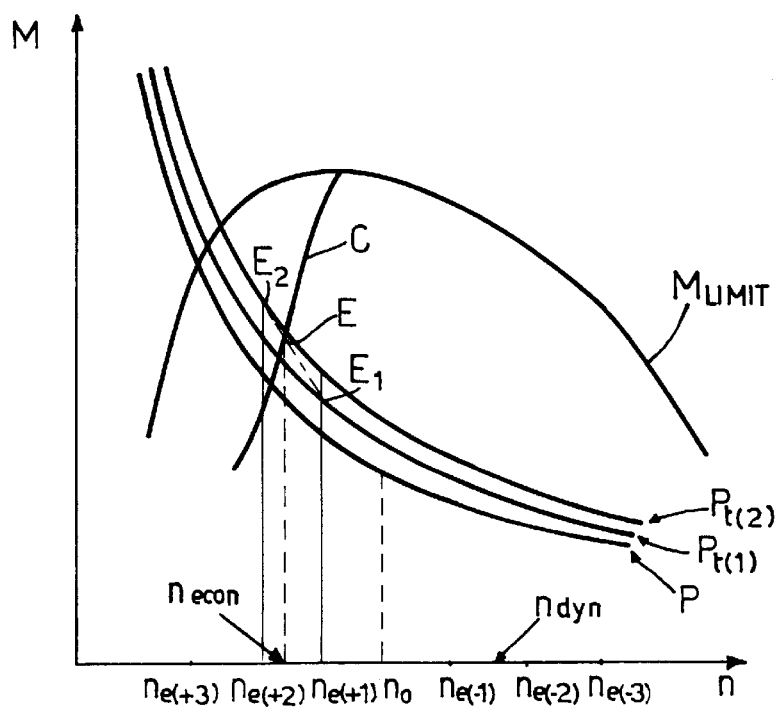
FIG. 2 is a graph showing an example of the determining of characteristic quantities of the control method according to the invention.
Figure 3:
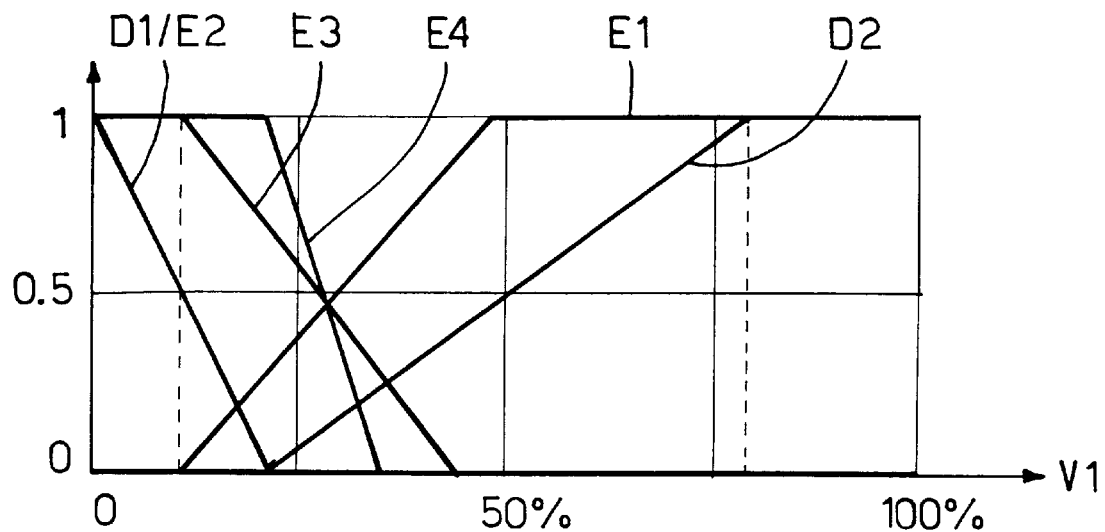
FIGS. 3 to 8 are graphs relating to the functions used for determining characteristic quantities of the control method according to the invention.
Figure 4:
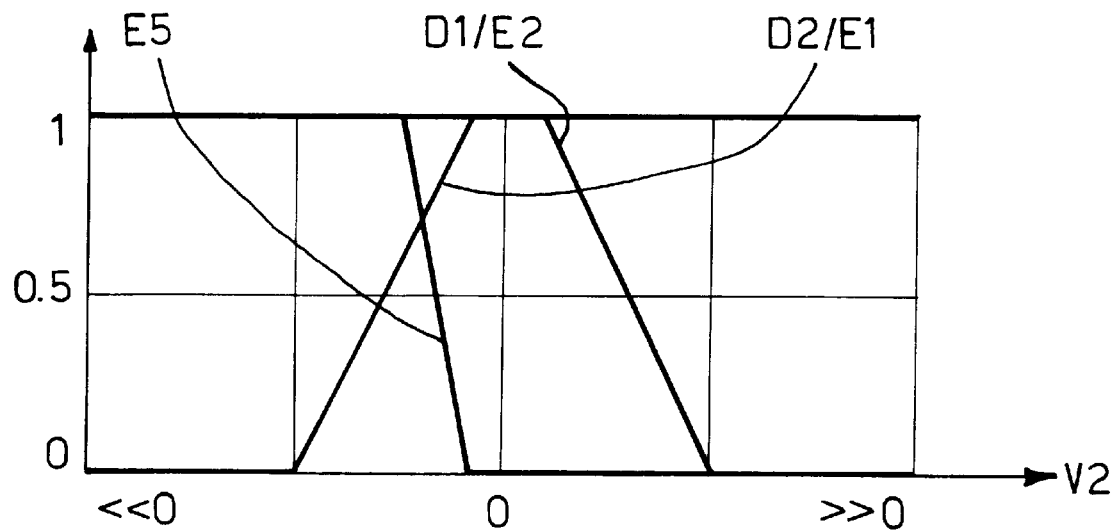
Figure 5:
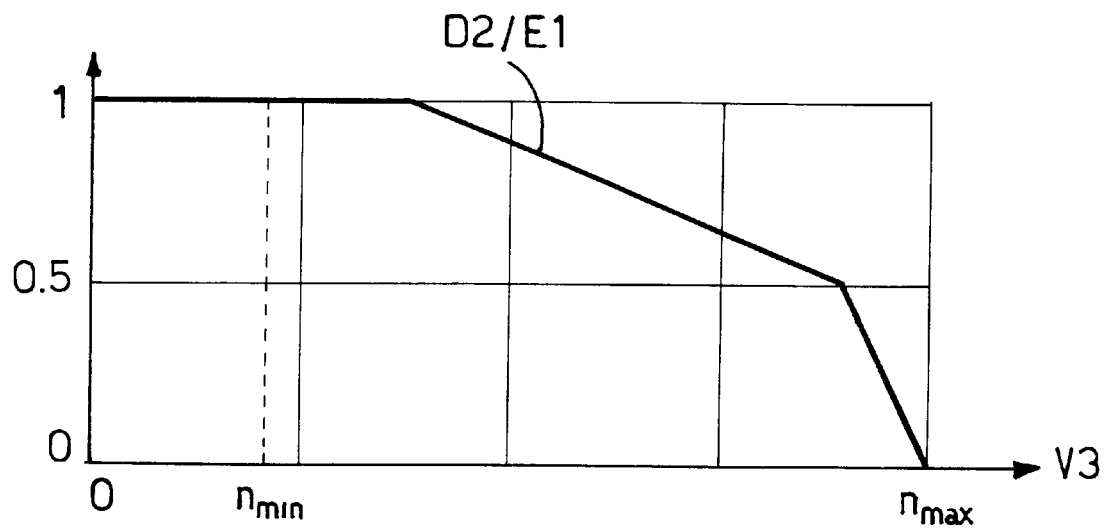
Figure 6:
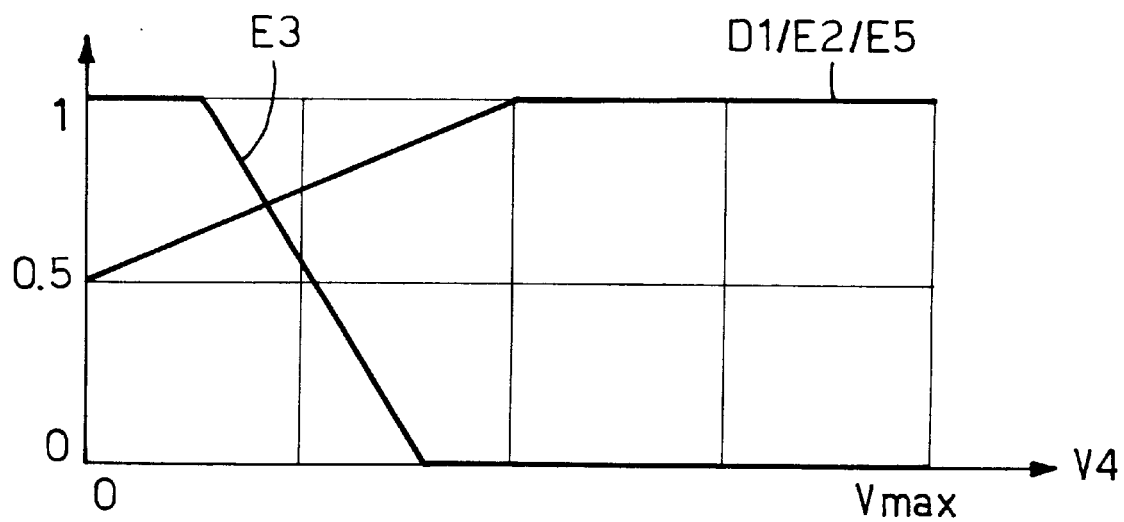
Figure 7:
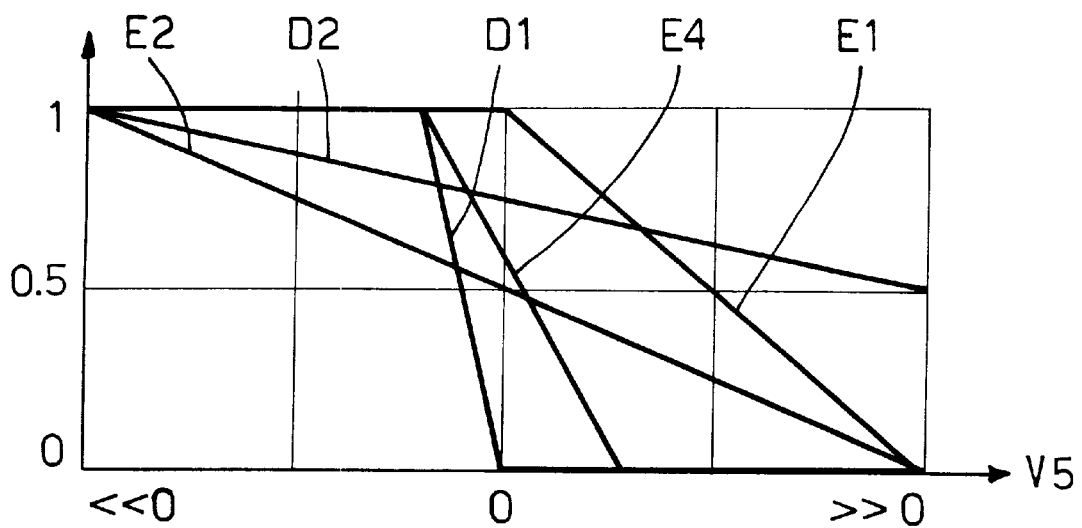
Figure 8:
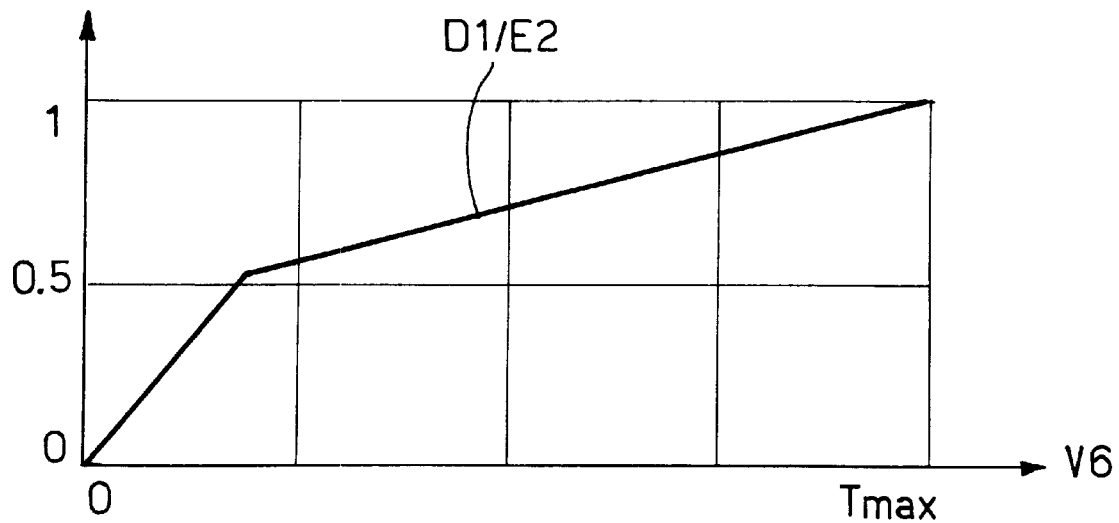

The first step comprises calculating the theoretical increments or decrements Ge, Gd in the gear number (even if not whole) required to reach, starting from the actual condition, the engine speed values $n_{econ}$, $n_{dyn}$ corresponding respectively to the two above-mentioned limit conditions (FIG. 2).

The calculation, which will be described analytically below, takes into account the loss of speed during the gear-change transient. Under normal conditions, a positive value is obtained in the calculation relating to minimum consumption and a negative value in that relating to dynamic driving.

The actual increment/decrement in the gear number for obtaining the optimum new gear starting from the present gear is defined by an average of the above-defined values Gd and Ge, weighted by means of weighting coefficients Kd and Ke which take into account the actual driving conditions with respect to the two extreme situations described above, and rounded off to the nearest whole number; this result, if it differs fro m 0, determines the number of gears and the direction of the change.

The methods for calculating Kd, Ke, Gd, Ge will now be described in detail.

The coefficients (Kd and Ke) are calculated separately on the basis of the driving conditions; whereas the conditions which identify dynamic driving are clearly defined (braking and demand for maximum acceleration), those which identify the economy driving conditions are substantially less clearly defined; therefore, economy driving is identified indirectly, by evaluating the incidence of conditions which limit economy, as will be described below.

The operating conditions taken into consideration for the calculation of Ke are as follows:
E1. Demand for acceleration
E2. Operation of brakes
E3. Queue
E4. Deceleration
E5. Release of accelerator pedal The operating conditions taken into consideration for the calculation of Kd are as follows:
D1. Braking
D2. Demand for maximum acceleration (kick-down).

The recognition of these particular driving conditions is achieved by considering the following variables:
V1. Position of the accelerator pedal, for example expressed as a percentage of travel and, therefore, variable between 0 (released) and 100 % (depressed to the end of travel).
V2. Derivative of the accelerator pedal position
V3. Engine speed
V4. Vehicle speed
V5. Acceleration of vehicle
V6. Actuation time of the service brake and/or engine braking.

The rules of fuzzy logic or assertions which are associated with driving conditions, related variables and arrays (fuzzy) of values of these variables are set out in the following Table 1:

| Conditions | Variables | Values |
|---|---|---|
| E1 | V1 | depressed |
|  | V2 | positive |
|  | V3 | low |
|  | V5 | negative |
| E2 | V1 | released |
|  | V2 | negative |
|  | V4 | high |
|  | V5 | negative |
|  | V6 | high |
| E3 | V1 | slightly depressed |
|  | V4 | low |
| E4 | V1 | slightly depressed |
|  | V5 | negative |
| E5 | V2 | negative |
|  | V4 | high |
| D1 | V1 | released |
|  | V2 | negative |
|  | V4 | high |
|  | V5 | negative |
|  | V6 | high |
| D2 | V1 | fully depressed |
|  | V2 | positive |
|  | V3 | low |
|  | V5 | negative |

The functions which express, for each value of the variables V1 . . . V6, the membership degree to the fuzzy sets indicated in the "values" column of the Table are illustrated in the graphs of FIGS. 3 to 8.

The calculation of each factor Kd, Ke is carried out in the following manner:
1. For each of the six variables there is obtained the value of each associated function (membership degree)
2. For each condition E1, . . . , D2 there is considered the product of each variable involved and of the relative membership degree.
3. The maximum product is established in relation to the dynamic driving conditions D1, D2; this product constitutes Kd.
4. The maximum product is established in relation to the conditions determined for economy driving E1, . . . , E5; Ke is defined by the complement to 1 of said number insofar as, as already stated previously, the considerations taken into consideration indicate deviations from the economy driving condition, not definable per se.

For the calculation of Ge and of Gd there are firstly calculated the engine speed values corresponding to whole number gear increments/decrements with respect to the actual gear, taking into account the loss of speed during the gear-change transient, by means of relationships of the type:

$$n_{e(i)} = f_{\tau i}(v - \delta v)$$

wherein $n_{e(i)}$ is the expected value of the engine speed at the end of the gear-change, in the various gears corresponding to a whole number increment of value i of the gear number (where i=−3, . . . , +3),
$f_{\tau i}$ are functions depending on the transmission ratios of the various gears, which for reasons of brevity are not specified since they are obvious to the person skilled in the art;
v is the actual speed of the vehicle; and
δv is the decrement in speed of the vehicle during the gear-change, which can be calculated on the basis of the known driving resistance and the time of the gear-change, using known physical laws.

The calculation of Ge is effected by ensuring that at the end of the gear-change the engine speed is equal to a target value $n_{econ}$ which is the x-axis of point E of the minimum consumption curve having as the y-axis a target power value increased with respect to the actual power on the basis of the value of Kd in accordance to the expression:

$$P_t = P \cdot [1 + kd \cdot (n/n_e - 1)], \qquad (3)$$

wherein:
$P_t$=target power
P=actual power
n=actual engine speed
$n_e$=engine speed predicted after the gear-change (<n), taking into account the loss of speed of the vehicle during the gear-change transient.

To carry out this calculation, the target powers Pt(i) corresponding to the whole number increments (i) of the gear number are considered. For each of said curves the point E(i) is considered to have as x-axis the corresponding value $n_{e(i)}$; finally, once the pair of points E(i) corresponding to consecutive whole number increments and situated on opposite sides of the minimum consumption curve C (E1 and E2 in the example of FIG. 2) have been established, the point E is established as an intersection between the line connecting these points and the minimum consumption curve C.

When $n_{econ}$ is known, which is the x-axis of point E, the value of the theoretical value Ge which would bring to a conclusion the gear-change upon reaching said engine speed value is obtained by linear interpolation between the values of the whole number increments i (values equal to 1 and 2 in the example of FIG. 2), to which correspond the two values $n_{e(i)}$ which encapsulate $n_{econ}$ (respectively $n_{e(+1)}$ and $n_{e(+2)}$ in the example of FIG. 2).

However, for the calculation of Gd the prevailing dynamic driving condition is taken into condition.

If the dynamic braking condition prevails, i.e. Kd derived from the condition D1 the target value of the engine speed is then calculated with the formula:

$$n_{dyn}=n_{LIM}+a/a_{MAX}\cdot(n\cdot_{MAX}-n_{LIM}) \quad (4)$$

wherein:

$n_{LIM}$: is the lower limit of the target engine speed, for example chosen to be equal to 2200 rpm;

a: deceleration of the vehicle;

$a_{MAX}$: maximum deceleration of the vehicle;

$n\cdot_{MAX}$: maximum engine speed (for example 3050 rpm).

Therefore, the deceleration of the vehicle is used as a parameter for detecting the braking action; from the preceding formula it is observed that $n_{dyn}$ increases as a increases: i.e. with a view to bringing the operating point of the engine towards the high number of revolutions where the braking torque generated by the engine itself is at its highest.

However, if the dynamic "kick-down" condition prevails, the engine speed which ensures the maximum power is used as target value, i.e.

$$n_{dyn}=n_{PMAX}. \quad (5)$$

The calculation of Gd is effected by linear interpolation between the decrements corresponding to the pair of values $n_{e(1)}$ which approximate by excess and by error $n_{dyn}$ (in the example of FIG. 2 this pair is $n_{e(-1)}$, $n_{e(-2)}$).

The effective increment of the gear number, i.e. the number of gears which has to be added to or subtracted from the actual gear so as to obtain the optimum gear, is defined by the rounding-off to the nearest whole number of the average of Ge and Gd respectively weighted with Ke and Kd, i.e by the following expression:

$$I=\text{trunc}[Ge\cdot Ke+Gd\cdot Kd+0.5\cdot\text{sign}(Ge\cdot Ke+Gd\cdot Kd)] \quad (6)$$

When the control unit 10 detects an increment I which is not zero and is stable for a predetermined period of time, for example equal to 300 ms, it ensures the starting of the gear-change sequence, controlling in a known manner, which will not be described in detail, the actuators 8, 9 of the gearbox 3 and of the clutch 4 and the supply to the engine 2 so as to induce the release of the clutch 4, the disengagement of the present gear, the synchronisation of the gearbox 3 and the suitably modulated re-engagement of the clutch 4.

To avoid excessively frequent gear-changes, with a resultant excessive discontinuity in the transmission of torque, the algorithm of selection of the optimum gear is suspended during a gear-change and restarted after a predetermined time, for example 3 seconds. Additionally, in a predetermined period of time (for example in the first 10 seconds) after the gear-change the direction of the last gear-change and that possibly required to reach a new optimum gear is considered. If the directions are contrary and the brake pedal has not been depressed, equation (6) is substituted by the following:

$$I=\text{trunc}[Ge\cdot Ke+Gd\cdot Kd+0.5\cdot t/T\cdot\text{sign}(GeKe+GdKd)] \quad (7)$$

wherein t is the time elapsed since the last gear-change and T is a constant equal to the amplitude of said period (for example 10 seconds); the gear increment is thus calculated at least initially by means of simple truncation (and not rounding off) of the weighted average of Ge and Gd, the transition from one to the other approximation criterion to the whole number being linear during said period. In this way, if the optimum transmission ratio lies between two adjacent gears, repeated changes between the gears themselves are avoided.

C. Control of the Engine in the Stage Immediately Following the Gear-Change.

After an automatic gear-change, the control unit 10 controls the supply to the engine 2 in such a way that the engine produces the target power $P_t$ defined below. To achieve this the admission of fuel is adjusted, on the basis of the regulator map and the engine speed being known. The calculation of the target power P, is effected in different ways, depending on the direction of the gear-change.

For gear-changes towards a higher gear the factor Kd is considered, even though it is a minor value with respect to Ke: if Kd is derived from the braking condition of dynamic driving (D1), the target power is the value itself of the actual power; however, if Kd is derived from the demand for maximum acceleration (driving condition D2), the target power is increased with respect to the value of actual power based on the formula:

$$P_t=P\cdot[1+kd\cdot(n/n_e-1)], \quad (3)$$

wherein:

$P_t$=target power;

P=actual power;

n=engine speed (before the gear-change)

$n_e$=engine speed predicted after the gear-change (<n).

The factor Kd is considered even for gear-changes towards a lower gear but in this case it is weighted with respect to Ke: if Kd results from the braking condition (D1), the target power is placed equal to 0; however, if Kd derives from the demand for maximum acceleration (D2), the power is constrained to a target value determined on the basis of the regulator map and the values of the accelerator pedal position and of predicted engine speed, obtained at the instant of the gear-change demand.

The target position of the accelerator pedal ($p_t$) imposed in the moments succeeding the gear-change is established on the basis of the target power and the regulator map.

The power is maintained constant and equal to the value of the target power for a first predetermined period of time, for example equal to 3 seconds, starting from the conclusion of the gear-change, and therefore during a second period of time, for example equal to 7 seconds, the control unit gradually restores control of the admission of fuel to the driver, suitably with a linear law; in practice, the control unit transmits to the regulator a signal corresponding to a fictitious position of the accelerator pedal, firstly equal to the position $p_t$ which would give rise to the target power, and therefore to a value which passes linearly from $p_t$ to $p_{acc}$ (value of the actual position of the accelerator, which is indicative of the power demanded by the driver) during the second period.

However, for safety reasons, control is immediately restored to the driver whenever the brake pedal is depressed or the accelerator pedal is fully released. Moreover, in the first 3 seconds after the gear-change, the admission is varied to a greater extent as the difference between the value demanded and that calculated increases. The formula used to obtain this variation is as follows:

$$p_{mod}=p_t+(p_{acc}-p_t)\cdot(1-e^{-t/T}) \quad (7),$$

wherein i $p_{mod}$ is the fictitious position of the pedal altered to take into account special driving conditions, $p_t$ is the pedal position corresponding to the target power, $p_{acc}$ is the position of the accelerator pedal, t is the time elapsed from the conclusion of the gear-change, T is the time calculated according to the expression $$T = T_1 - (|p_{acc} - p_t|) \cdot (T_1 - T_2)/p_{max} \qquad (8),$$

$T_1$ and $T_2$ being constant, for example equal to 20 seconds and 3 seconds respectively, and $p_{max}$ being the maximum position of the accelerator pedal.

The advantages which can be achieved with the present invention are apparent from a study of the features of the method of controlling the power unit 1 in accordance therewith.

In particular, said method makes it possible to determine the optimum gear to be engaged so as to obtain the best compromise between operating economy and dynamic performance, taking into account road conditions and the performance demanded by the driver. The logic for calculating the optimum gear is unique and is applicable to all driving conditions.

Furthermore, the method makes it possible to achieve particularly accurate control of the power unit, since it takes into account the predicted loss of speed of the vehicle during the gear-changes, based on the calculation of characteristic parameters of the vehicle (in particular its weight) and on the travel conditions (in particular the driving resistance). The engine power is also controlled automatically after the gear-changes, so as to adapt it to the driving conditions detected. Since the power control is restored to the driver in a gradual manner, after the gear-change, anomalies or discontinuity in progression are not noticed.

Finally, it is evident that the method described can be subject to modifications and variants which do not depart from the scope of protection of the claims.

In particular, the optimum gear can be calculated on the basis of different function of Ge and Gd; the functions which are utilised in the calculation of Ke and Kd may be different.

Moreover, particular instances of gear-changes may be provided, in which the selection of the optimum gear is carried out in accordance with a different logic from that described above; for example, these particular cases may be automatic take-off, the engagement of a gear to leave neutral and the case of deceleration.

In these instances, recognised by the control unit on the basis of a suitable combination of operational parameters detected by the onboard sensors, the optimum gear can be engaged on the basis of stored logics.

Advantageously, in the case of take-off from neutral and leaving neutral with the vehicle moving, the engagement of the gear can be subordinate to a manual consent actuation, for example an "UP" control on the selection lever, for safety reasons.

In the case of deceleration, a limitation may be provided in the number of sequential down-changes which, if carried out, could prejudice the quality of braking and the driving comfort.

We claim:

1. A method for controlling a power unit (1) of a vehicle, the power unit comprising an engine (2), a clutch (4) and an automatic gearbox (3) provided with a plurality of gears to be engaged, the method comprising the steps of:
   a) providing a first stage for determining the value of a plurality of operating parameters related to driving conditions,
   b) providing a second stage for determining a first quantity (Ge) representing a gear to be engaged so as to achieve a condition for optimizing fuel consumption, and a second quantity (Gd) representing a gear to be engaged so as to achieve a condition for optimizing engine performance, and
   c) providing a third stage for determining an optimum gear based on a function of the first quantity and the second quantity depending on the value of the plurality of operating parameters related to driving conditions, wherein the first quantity and the second quantity represent theoretical increments/decrements in the gear number required to pass from an actual operating condition of the vehicle to a minimum consumption condition maintaining a power value ($P_t$) related to the actual value and, respectively, to a maximum dynamic condition of engine speed ($n_{dyn}$).

2. A method according to claim 1, wherein the function for the determining the optimum gear is an average of the theoretical increments/decrements weighted based upon weighting factors (Ke, Kd) calculated on the basis of the operating parameters.

3. A method according to claim 2, wherein the weighting factors (Ke, Kd) are calculated fuzzy logic rules.

4. A method according to claim 1, wherein the second stage comprises an operation of calculating the speed of the engine ($n_{e(i)}$) for a plurality of whole number increments/decrements of the gear number taking into account the loss in speed during the gear-change, theoretical increments/decrements being calculated by interpolation between pairs of whole number increments/decrements corresponding to engine speed values ($n_{e(i)}$), approximated by error and by excess, and which are the minimum consumption engine speed ($n_{econ}$) and, respectively dynamic maximum speed ($n_{dyn}$).

5. A method according to claim 1, and further including the step of providing a preliminary stage for determining the weight of the vehicle on the basis of a dynamic equation for the vehicle.

6. A method according to claim 5, and wherein the first stage comprises calculating driving resistance of the vehicle, the loss of speed during the gear-change being calculated on the basis of the value of the driving resistance.

7. A method according to claim 1, and further comprising the step of providing a fourth stage for controlling the engine power after the gear-change.

8. A method according to claim 8, and wherein the fourth stage comprises maintaining the engine power constant and equal to a value depending on the driving conditions for a first period of time, and restoring power control to the driver linearly during a second period.

* * * * *